United States Patent Office 3,097,141
Patented July 9, 1963

3,097,141
IMMUNOLOGICAL METHOD
Elizabeth N. Wilcox Kidwell, 16 E. 9th St.,
New York, N.Y.
No Drawing. Filed Feb. 26, 1959, Ser. No. 795,601
16 Claims. (Cl. 167—78)

This invention relates to a method of modification of anaphylactogens which reduces toxicity while retaining antigenicity.

It is an object of this invention to provide antigenic materials of reduced toxicity.

It is a further object to provide a means for desensitization to anaphylactic shock.

An additional object is to provide novel means for studying and preventing hypersensitivity.

Other objects will in part be obvious and will in part appear hereinafter.

My modification of biological substances involves essentially four steps in the following order: pepsin digest, oxidation, heat, and ion exchange. This modification procedure provides useful biochemicals which retain substantial antigenicity with reduced toxicity and minimum anaphylactic or sensitizing properties and which will remain stable at room temperature for a prolonged period, e.g. 11 years.

When modifying bacteria, a pure strain of bacteria is first grown on agar slants and harvested in saline at the point of optimum growth. It is then centrifuged at about 1000 r.p.m. for one minute to remove agar fragments, and is then killed with heat or phenol prior to beginning the modification. As discussed below, an endotoxin may be prepared by including the additional step of sonic disruption.

In carrying out my modification, a solution is prepared by dissolving pure crystalline pepsin, sterilized by repeatedly freezing and thawing, in distilled water. For a suspension of about 5 billion organisms per cc., 1 mg. of pepsin per cc. is adequate. Proteolytic enzymes other than pepsin, such as papain, may also be used. The pH is promptly adjusted with 10% HCl to a pH of approximately 4–5, suitably 4.6. The mixture is then placed in an incubator at about 37° C. for about 8–24, preferably 16 hours, after which it adjusted with 10% NaOH to a pH of about 7.

In the second step of modification according to my invention the incubated, pepsin-digested cells are oxidized, for example by addition of equal quantities of 30% sodium nitrite and 30% acetic acid. 5 cc. of each for every 3 cc. of bacterial suspension is adequate. After about four hours at room temperature the vaccine is centrifuged and washed twice with sterilized distilled water and twice with sterilized N saline. When working with virus vaccines it is preferred to continue the oxidation process for twenty-four hours.

The oxidizing agents noted above tend to destroy some biochemicals. When working with such materials it is preferable to use commercial $H_2O_2$ as the oxidant in an amount approximating one-third the volume of the suspension to be modified. The preparation is placed in an incubator overnight, the exact time being unimportant.

The third step is heat modification. The oxidized preparation, suitably contained in covered glass jars which are sealed, is placed in a water bath at a temperature of from about 50 to 100° C. I have found that the optimum temperature for each bacterium may vary to some degree but is easily determined for each species. Thus 56° C. has been found to be the optimum for Staphylococcus, Streptococcus, E. coli, tubercle bacillus; 60° C. for Brucella; 64° C. for the poliomyelitis virus; 100° C. for the tobacco mosaic virus. For biochemicals I employ 58° C. for animal use.

The temperature and time of the heating step in reducing the toxicity of antigens while retaining their antigenicity according to my invention may vary respectively from about 50° to 100° C. and about 15 to 28 hours.

The optimum heat modification temperature and time may be determined by a simple leukocyte response test which I have discovered. A suspension of cells in serum is drawn from a fresh sample of whole clotted blood of the species to which the modified substance is to be administered. A small drop of serum is placed on a slide and a small drop of "Viability Stain" is added and mingled with the blood. (The Viability Stain is prepared from 0.1 g. Toluidin blue powder, 0.02 g. Janus green powder and 1 ml. of absolute alcohol. The mixture is ground and washed through filter paper with 200 ml. of distilled water.) A drop of the modified agent is then introduced, a coverslip is placed over the mixture, and the slide examined under oil immersion. The immediate and complete disappearance of all leukocytes with no debris remaining indicates effective response to a well modified agent.

An even more effective method for determining optimum modification is through the use of hemobiological slides.

This technique involves the use of a specimen of whole clotted blood, tested with antigenic substances prepared in known concentrations. A chamber 22×40 mm. is marked with liquid plastic on a slide. The slide and everything which comes in contact with the blood is flamed. A piece of clot from the blood sample is placed on the slide, and three drops of blood and one drop of test substances are added. The preparation is covered, with air excluded, with a coverslip, which is sealed in place with impervious plastic. The slides are preserved under reduced oxygen until resistant response appears sometimes as early as one week, or pathologic changes develop about 6 or more weeks later.

This test is not so quickly performed as those described above, but is particularly useful in determining when the patient is suffering from disease of an organ or tissue, and the blood, especially the clot, is damaged in the manner prescribed by substances either bacterial or biochemical, specific to the diseased area. Biochemicals found capable of damaging blood as described are believed to act as an allergen to which the body establishes a pathologic response by acquiring sensitivity under circumstances of stress. The immunologic treatment of chronic disease would therefore involve modification of each substance in accordance with this invention and the use of such a modified agent for desensitization to the corresponding normal substance.

A well modified substance will produce a uniformly more resistant response in hemobiological slides than does the corresponding normal one. The response to the optimumly modified substance will be more superficial and produce more hemoglobin crystals and less clot damage than does the unmodified substance. It is preferred to test a group of blood samples from several patients.

A more antigenic toxoid is produced if heat modification is carried out for only 6 hours. Such toxoid may satisfactorily be used with all animal species.

Bacterial substances are next subjected to ultrasonic disruption to provide a toxoid. Biochemicals and viruses are not subjected to this treatment, however. The ultrasonic disruption of the cells is suitably effected by subjecting the heat-modified vaccine to the influence of ultrasonic waves for a period from about 20 minutes to about 90 minutes and, desirably, at a temperature not above 30° C.

More particularly, a rectangular vat, 12″ x 8″ x 4″ deep, having a 4″ diameter focused piezo electric element built into the bottom, may be used as the ultrasonic transducer. The vat is partially filled with transformer oil, in such a way that the ultrasonic power generated by the piezo electric element is propagated through the oil toward a focal region within the oil. A cooling coil may be immersed in the oil, thereby providing a means of maintaining the oil temperature at approximately 4° C. The coil should be positioned so that it does not interfere with the propagation of the sound energy from the concave surface of the piezo electric element toward the focal region.

Small quantities (15 cc.) were sealed in 35 cc. thin-walled glass flasks. The bottoms of these flasks were spherical in shape, and were placed in the oil transmission medium in such a way that the focal region of the piezo electric transducer fell inside the flask within the material. In this position, sound energy from the concave surface of the piezo electric element approaches the flask normal to its surface, and maximum transmission of energy through the glass with minimum reflection and deflection is thereby possible.

A frequency of 800 kilocycles per second was employed, and the material was radiated for a period of about 20 minutes. Sound intensity in the focal region within the material, measured by means of a radiation balance (compensated for liquid flow), was in excess of 1,000 watts per square centimeter. The focal region of high intensity sound energy encompassed a volume of approximately 10 x 10 x 10 mm. It may be mentioned that the passage of the material through the focal region is a random phenomenon. After about 20 minutes' radiation, approximately ninety percent of the material was found to have been subjected to the high intensity ultrasonic energy. Satisfactory results have been obtained at high frequencies.

The final modification step comprises contacting the heat-modified substance with an ion exchange resin. Non-bacterial substances are so treated directly following heat modification. Bacterial substances from which a toxoid has been prepared by sonic disruption are first combined with a portion of the undisrupted, heat-modified bacteria from which it was prepared, and the combination is contacted with an ion exchange resin. It is preferred to use a mixture of cationic and anionic resins. Resins produced by Rohm & Haas and designated "Amberlites" IR–112; IR–120; IR–50; IRA–400; IRA–410; IR–4B and "IR–45" preferably "IR–120" and "IRA–410" have been found suitable.

The "Amberlites" just above mentioned may be more particularly identified as follows:

IR–112 and IR–120 are water-insoluble sulphonated polymerizates of a mixture of a polyvinyl aryl compound and a monovinyl aryl compound, and are described in Patent No. 2,366,007, granted December 26, 1944.

IRC–50 contains a substantial amount of an insoluble, infusible copolymer of a polymerizable mixture comprising (1) at least one compound having a polymerizable $$CH_2=C<$$

grouping and at least one other polymerizable grouping, the unsaturated bonds of said polymerizable groupings being non-conjugated with respect to each other, and (2) at least one acrylic acid having the structural formula

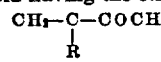

where R is a substituent selected from the class consisting of hydrogen, chlorine, bromine, monovalent alkyl radicals, monovalent aralkyl radicals, monovalent aryl radicals and monovalent alkaryl radicals, and is described in Patent 2,340,111, granted January 25, 1944.

IRA–400 is the reaction product of (1) a halomethylated copolymer of a major proportion of a monovinyl aromatic hydrocarbon with from 0.5 to 20.0% of a divinyl aromatic hydrocarbon, and (2) a tertiary monoamine and is described in Patent 2,591,573, granted April 1, 1952.

IRA–410 is the reaction product of (1) a benzene-insoluble copolymer containing in chemically combined form from 0.5 to 40 percent by weight of a polyvinyl-aromatic hydrocarbon and from 99.5 to 60 percent of a monovinyl-aromatic compound of the class consisting of monovinyl-aromatic hydrocarbons having the vinyl radical directly attached to a carbon atom of the aromatic nucleus and nuclear halogenated derivatives thereof, which copolymer contains an average of from 0.2 to 1.2 halomethyl groups per aromatic nucleus in the copolymer, with (2) a tertiary amine selected from the group consisting of the tertiary mono- and di-alkyl N-substituted alkanol and alkanediol amines, and is described in Patent 2,614,099, granted October 14, 1952.

IR–4B is the product obtained by reacting by condensing together in an aqueous medium a polyphenylol alkane, one-half to two mols of an alkylene polyamine per phenylol group present in said alkane, and formaldehyde in an amount at least equivalent both to the phenylol groups and to the mols of polyamine, and is described in Patent 2,356,151, granted August 22, 1944.

IR–45 is a haloalkylated copolymer of a mixture of an aromatic monovinyl hydrocarbon and an aromatic divinyl hydrocarbon, said mixture containing a predominant amount of said monovinyl hydrocarbon and said copolymer containing on the aromatic nuclei substituent groups of the general formula:

$$—C_nH_{2n}X$$

in which $n$ is an integer of value one to four and X is a member of the group consisting of chlorine and bromine, is reacted with an amine containing a hydrogen atom on the nitrogen atom whereby a polymeric amine salt is formed, and is described in Patent 2,591,574, granted April 1, 1952.

Further IR–112 and IR–120 are strongly acidic sulphonic acid group cationic resins; IRC–50 is a weakly acidic carboxylic cationic resin; IRA–400 and IRA–410 are strongly basic quaternary amine anionic resins, and IR–4B and IR–45 are weakly basic polyamine anionic resins. It is to be understood that the term "Amberlites" as used herein and particularly in the claims refers to resins of the above identified kind.

Equal quantities of cationic and anionic resins which have been sterilized, suitably by autoclaving, may be used.

The time of contacting with the ion exchange resin is critical as will be shown below. For this reason the exact time at which contacting is initiated should therefore be carefully noted. In order to determine the optimum period it is convenient to employ the fibrinagglutination technique which I have discovered. This technique demonstrates a mechanism of immunological response for which hitherto there has been no laboratory test. This method may be used to determine the point of optimum modification and is a particularly useful method in practicing my invention. By use of this technique it is possible to remove the modified substance from the resins at the point of optimum clumping, at which time they are of the greatest efficacy. Two stains are prepared as follows:

Viability Stain—
    Toluidin blue powder _____gm\_\_ .1
    Janus green powder _____gm\_\_ .02
    Absolute alcohol _____ml\_\_ .1

Grind and wash through filter paper with 200 ml. of distilled water.

Antigen Stain—
 Bluish eosin _____ mg__ 15
 Absolute alcohol _____ ml__ 1

Grind and wash through filter paper with 50 ml. of distilled water.

The Janus green is not essential for the counter-staining reaction, but its presence makes the Viability stain also a useful method for the study of leukocyte activity.

The fibrinagglutination method is then practiced as follows:

A solution of whole blood is prepared by placing a drop of fingertip blood in 10 ml. saline and diluting to approximatedly 1:10,000. Heparinized blood or plasma may be used, but not clotted blood or serum. A small drop of Viability stain is placed on a clean slide and covered with a drop of the dilute blood. A drop of the red stain is placed separately on the slide. The modified substance to be tested is removed from the resins with a loop, added to the blue drop and mingled for a moment before the red stain is mixed in. The blue dye binds the fibrin particles. The modified agent, if not at a point of optimum modification, will, when added to the dilute blood and mingled with the red stain, result in a clear, pinkish suspension. If the test is made on the day and hour which is optimum for the particular substance or group of substances being modified, and at 9, 17, 39 or 47 minutes past the hour at which the substance was first placed on the resins, and the substance removed immediately or at the next clumping point, the modified agent so obtained will be one which exerts a strong attraction for fibrin particles. On the slide, the test substance, clotting elements and stain form profuse purple clumps which, if removed at the optimum time of contact, are grossly visible. At times of contact other than the optimum, the clumps, if any, will be small and innumerable. The object accordingly is to determine the point at which the clumps are few, deep purple and compact. The modified substance exposed to the resins may exhibit this agglutinating force for a matter of a few seconds to a few minutes, during which time the pH of the suspension on the resins is lowered a point or two.

The fluctuation of clumping may continue for about two hours to several hours. Prior to this period, clumping appears to be uniform at all times. After an interval of fluctuation, clumping may disappear entirely or may again become uniform. There may be more than one day at which a zone of fluctuation appears, as for example, the 8th, 19th and 30th. The majority of proteins and lipids clump on the 19th day, carbohydrates on the 14th, albumins on the 24th, histamine on the 10th, 19th and 30th, acetylcholine on the 7th, minerals on the 8th and 19th, urea on the 14th. It seems possible that each bacterial species may have a distinctive fibrinagglutination point, e.g.: Streptococcus, Staphylococcus and Brucella on the 24th day and *Mycobacterium tuberculosis* on the 25th day. The staining technique for fibrinagglutination is thus useful as an aid in bacterial classification.

Allergy or hypersensitivity is an altered reactivity of the tissues toward particular substances, not inherent, but acquired by the introduction into the body by any route of a foreign substance, usually protein in nature. The mechanism of hypersensitivity, while subject to many variations, generally involves the fixation of antigen tot tissue cells or free cells in the blood, followed after an interval by the local production of specific antibody, which remains attached to the sensitized tissue. A subsequent dose or doses of the specific antigen reacts with the latent specific antibody, producing results which may not be clinically obvious or may cause marked pathologic changes.

Certain laboratory animals, notably the guinea pig, are susceptible to acute, fatal systemic shock, termed anaphylaxis. The phenomenon has received intensive study, and the suitable antigens, dosage, routes and sensitizing intervals are well known. Repeated small subcutaneous doses, especially in rabbits, produce the Arthus phenomenon with tissue damage similar to that found in many disease states.

In the present state of the art, there is no previously developed method of modification which fulfills the conditions of the classical experiment in anaphylaxis, which requires that, with suitable dosage and sensitizing interval, the following results shall be obtained:

TABLE A

| Group | A | B | C | D |
|---|---|---|---|---|
| Sensitizing Dose | Normal | Normal | Modified | Modified |
| Shock dose | do | Modified | Normal | do |
| Result | Death | Reaction survival | Reaction survival | Reaction survival |

A failure of reaction in groups B or C would indicate that antigenicity has been altered. Death in B, C and D indicates that toxicity has not been reduced. A failure of reaction in these 3 groups indicates that antigenicity has been destroyed.

I have found that by employing horse serum modified in accordance with my method anaphylactic shock in guinea pigs can be mitigated or avoided. Table B shows that the animals to which normal horse serum was administered with adequate timing and dosage suffered severe anaphylactic shock and even death, while those who received one dose of normal serum and the other dose of my modified serum generally suffered only mild effects. Those who received my modified serum in both doses exhibited little or no anaphylactic response.

TABLE B

*Pattern of Anaphylactic Response in 18 Guinea Pig Experiments With Normal and Modified Horse Serum*

| Group | A | B | C | D |
|---|---|---|---|---|
| Number of animals | 6 | 4 | 4 | 4 |
| Sensitizing dose | Normal serum | Normal serum | Modified serum | Modified serum |
| Shock dose | Normal serum | Modified serum | Normal serum | Modified serum |
| Result | Shock syndrome; death if dosage was adequate | Shock syndrome; recovery | Shock syndrome; recovery | No shock syndrome; alarm reaction in two |
| Degree of shock[1] | 4 x | 1 x | 3 x | 0 |
|  | 1 x | 0 | 1 x | 0 |
|  | 2 x | 1 x | 1 x | 0 |
|  | 4 x | 2 x | 2 x | 1x |
|  | 4 x |  |  |  |
|  | 3 x |  |  |  |

[1] Symbols are as follows: 0=none; 1 x=dyspnea; 2 x=convulsions or cyanosis; 3 x= coma; 4 x= death.

Further evidence of the desensitizing effect of my modification method is shown by the results of controlled anaphylaxis experiments on guinea pigs, using horse serum. Sensitizing and shock dosages, both with unmodified serum, at an interval of one week resulted in the typical shock syndrome and death in five minutes. In a second animal, a sensitizing dose of normal serum, followed by a shock dose of horse serum modified by the method of my invention resulted in a mild reaction of sneezing and dyspnea, and the animal recovered. 24 hours later the latter animal was given a further shock dose of normal serum; there was slight snuffling, and the animal survived. 24 hours thereafter the latter animal was given an additional dose of normal serum, followed in one week by a shock dose of normal serum; there was slight snuffling and the animal survived. 3½ weeks later the same animal was given a shock dose of normal serum, and experienced no reaction.

Thus the modified serum caused some initial reaction, showing its antigenicity, but the reaction was mild. Moreover, the animal had been desensitized to a shock dose of normal serum administered shortly thereafter. Even more surprisingly, subsequent sensitizing and shock doses, both of normal serum, failed to produce the normal shock syndrome and death, but only a slight snuffling. And a final shock dosage gave no reaction.

In the present state of the art no method is known for inducing prolonged desensitization in the manner I have now provided. My modification procedures accordingly provide a novel and useful means of reducing or avoiding anaphylactic shock and constitute a useful means for studying such reactions.

The classical anaphylactogen is ovalbumin. Employed by the usual intravenous route, with a sensitizing period as short as a week, it has produced acute, fatal systemic shock in guinea pigs with doses as small as 0.1 mg. When both injections are given by the intraperintoneal route, much larger doses are tolerated. Shock is protracted, and there is more time to observe symptoms. In vivo changes which have been identified in studies of classical shock are: fall in blood pressure, decreased coagulability of blood, leukopenia and decrease in platelets, diminution of complement, release of histamine and acetylcholine from tissues, heparin from the liver and 5-hydroxytryptamine from platelets. Relaxation of smooth muscle is followed by contraction which causes the hair to bristle. It also produces venus and arterial spasm, which in presently accepted theory is the cause of the reduction of hemoglobin, evidenced by cyanosis.

In acute shock, antigen accumulates around the bronchii, causing a broncotetany, and the guinea pig dies with lungs distended. The chemical changes in protracted shock cause damage to many tissues. The lungs are often collapsed, edematous and hemorrhagic.

My own studies in hemobiological slides made on the blood of guinea pigs before and after shock have shown that the specific antigen oxidizes and reduces hemoglobin. At autopsy the blood and tissues of guinea pigs dead in protracted shock are cyanotic. Controls, if killed by concussion, have bright red blood and tissues of normal color. I have made numerous in vitro studies of blood and tissues of anaphylactic and normal animals and have found that proteolysis with the release of amino acids begins during shock. Similar changes in healthy tissues appear after several days.

I have modified ovalbumin by my method as previously described, including contact with ion exchange resins for 24 days, 11 hours, and 52 minutes. My modified specific antigens do not damage hemoglobin or cause proteolysis, even in the case of the death of a guinea pig caused by the intracardial injection of a preparation of bovine albumin not adequately modified. Hemobiological slides of the animal's blood showed none of the destructive changes produced by the unmodified specific antigen in the blood of anaphylactic guinea pigs.

Experiments which I have made in anaphylaxis with normal and modified ovalbumin have employed 3 strains of guinea pigs and are summarized in Tables C and H.

TABLE C

*Shock Syndrome Produced By Normal or Modified Crystalline Ovalbumin*

TWO EXPERIMENTS IN ANAPHYLAXIS WITH MALES OF INBRED LH STRAIN

| GP No. | Sensitizing dose | Treatment | Interval | Temp., °F. | Shock dose | Result | Active phase or | Until death | Temp. fluctuation, degrees |
|---|---|---|---|---|---|---|---|---|---|
| 375 | 10 mg. N | 0 | 29 | 105.8 | 10 mg. N | Fatal | | 150 min | 105.8– 94.3 |
| 369 | 10 mg. M | 0 | 29 | 102.7 | 10 mg. N | Slight | 90 min | | 102.9–100.5 |

| GP# No. | Erythema | Eating | Surface irritation | Digging hiding | Rectal bleeding | Miscellaneous | Dyspnea or rales | Air hunger | Cyanosis | Loss of tonicity | Convulsions | History after shock or autopsy findings |
|---|---|---|---|---|---|---|---|---|---|---|---|---|
| 375 | | | x | x | xx | | x | x | xxxx | xxxx | xxx | All organs and tissues cyanosed; lungs collapsed, inflamed. |
| 369 | | | x | | | | x | | x | | | Recovered; healthy. |

TABLE D

*Shock Syndrome Produced By Normal or Modified Crystalline Ovalbumin*

EIGHT EXPERIMENTS WITH FEMALES OF INBRED MF STRAIN

| GP No. | Sensitizing dose | Treatment | Interval | Temp., °F. | Shock dose | Result | Active phase or | Until death | Temp. fluctuation, degrees |
|---|---|---|---|---|---|---|---|---|---|
| 380 | 10 mg. N | A and B | 20 | 103 | 10 mg. N | Fatal | | 53 min | 103 – 98.9 |
| 382 | 10 mg. N | A and B | 20 | 102.5 | 10 mg. N | do | | 60 min | 102.9– 98.2 |
| 385 | 10 mg. N | A and B | 21 | 103.5 | 10 mg. M | Slight | 2¼ hrs | | 102.7–103.6 |
| 386 | 10 mg. N | A and B | 23 | 103 | 10 mg. M | Minimal | 35 min | | 103 –102 |
| 387 | 10 mg. N | A and B | 23 | 103 | 10 mg. M | do | 35 min | | 103 –102.5 |
| 389 | 10 mg. N | A and B | 23 | 103.7 | 10 mg. N | Fatal | | 65 min | 103.7– 99.3 |
| 390 | 10 mg. N | A | 23 | 102.9 | 10 mg. M | Slight | 60 min | | 102.9–101.6 |
| 384 | 10 mg. N | A and B | 42 | 104.7 | 10 mg. M | Minimal | 60 min | | 104.7–101.8 |
| 388 | 10 mg. N | A and B | 42 | 104.9 | 10 mg. N | Fatal | | 59 min | 104.9– 99.6 |
| 381 | 10 mg. N | A | 42 | 105.7 | 10 mg. N | do | | 47 min | 105.7–101.6 |
| 391 | 10 mg. N | A | 42 | 102.9 | 10 mg. M | Minimal | 49 min | | 102.9–101 |

TABLE D—Continued

| GP No. | Erythema | Eating | Surface irritation | Digging hiding | Rectal bleeding | Miscellaneous | Dyspnea or rales | Air hunger | Cyanosis | Loss of tonicity | Convulsions | History after shock or autopsy findings |
|---|---|---|---|---|---|---|---|---|---|---|---|---|
| 380 | xxx | | xx | xx | | Crying x | xxx | xxxx | xxxx | xx | xx | All organs and tissues cyanosed; lungs collapsed, atalectasis; few small spots on liver. |
| 382 | x | | xx | x | | | x | xxxx | xxxx | x | xxxx | All organs and tissues cyanosed; lungs distended; 2 small spots on liver. |
| 385 | x | xx | | xx | | Shivering xxxx | xx | | | | | Recovered; slight fever. |
| 386 | | xxx | x | | | | xx | | x | | | Do. |
| 387 | x | xx | x | | | Alarm xx | x | | | | | Do. |
| 389 | | | x | x | xxx | | x | x | xx | x | 0 | All organs and tissues cyanosed; lungs inflated and inflamed; 1 moderate spot in liver. |
| 390 | | | | | | Alarm xx | xx | | x | x | | Recovered; healthy. |
| 384 | | xxx | x | | x | | x | | | | | Killed; all organs and tissues normal in color and gross structure; lungs collapsed. |
| 388 | | | x | | | | | xx | xxxx | xx | xx | All organs and tissues cyanosed; spleen smaller than normal; interior of liver dark chocolate brown; lungs moderately distended, areas of atalectasis. |
| 381 | | | xxx | | | | | xx | xxxx | xx | xxxx | All organs and tissues cyanosed, but healthy; spleen smaller than normal; lungs ballooned. |
| 391 | | x | x | | x | Alarm x | | | | | | Killed; all organs and tissues normal in color and gross structure; spleen slightly enlarged; lungs collapsed. |

TABLE E

*Shock Syndrome Produced By Normal or Modified Crystalline Ovalbumin*

EXPERIMENTS IN ANAPHYLAXIS IN GUINEA PIGS OF INBRED LH STRAIN

Group A—Sensitized and Shocked With Normal Ovalbumin

| GP No. | Sensitizing dose | Interval in days | Temp., °F. | Shock dose | Result | Active phase | or | Until death | Temp. fluctuation, degrees |
|---|---|---|---|---|---|---|---|---|---|
| 351 | 10 mg. N | 18 | 102.9 | 10 mg. N | Severe | 35 min | | | 103.6–102.6 |
| 348 | 10 mg. N | 20 | 102.8 | 10 mg. N | do | 50 min | | | 103.3–100.4 |
| 349 | 10 mg. N | 22 | 101.6 | 20 mg. N | do | 60 min | | | 101.1– 99.8 |
| 352 | 10 mg. N | 24 | 102.4 | 20 mg. N | Fatal | | | 40 min | 101.9– 96.8 |
| 350 | 10 mg. N | 25 | 102.9 | 20 mg. N | do | | | 20 min | 102.9–101.7 |
| 353 | 10 mg. N | 25 | 103.1 | 10 mg. N | do | | | 70 min | 102.4– 95.2 |
| 354 | 10 mg. N | 25 | 103 | 10 mg. N | do | | | 50 min | 102.3– 98.3 |
| 367 | 100 mg. N | 25 | 102.7 | 10 mg. N | do | | | 70 min | 102.7– 98.6 |
| 364 | 100 mg. N | 25 | 103.4 | 10 mg. N | do | | | 65 min | 103.4– 98.8 |
| 370 | 10 mg. N | 23 | 103.2 | 10 mg. N | do | | | 27 min | 103.4–101.3 |
| 371 | 10 mg. N | 23 | 103.8 | 1 mg. N | Moderate | 2 hours | | | 103.8–100.9 |
| 375 | 10 mg. N | 29 | 105.8 | 10 mg. N | Fatal | | | 2½ hours | 105.8– 94.3 |
| 377 | 10 mg. N | 30 | 104.7 | 10 mg. N | do | | | Many hours | 104.7– 94.6 |

Group B—Sensitized With Normal, Shocked With Modified Ovalbumin

| GP No. | Sensitizing dose | Interval in days | Temp., °F. | Shock dose | Result | Active phase | or | Until death | Temp. fluctuation, degrees |
|---|---|---|---|---|---|---|---|---|---|
| 355 | 10 mg. N | 25 | 102 | 20 mg. M | Moderate | 70 min | | | 102.1–100.5 |
| 374 | 10 mg. N | 28 | 102.5 | 10 mg. M | Slight | 90 min | | | 102 –101.4 |
| 358 | 100 mg. N | 25 | 102.6 | 10 mg. M | do | 70 min | | | 102.6–101 |
| 366 | 100 mg. N | 25 | 102.5 | 10 mg. M | do | 55 min | | | 102.7–102 |

Group C—Sensitized With Modified, Shocked With Normal Ovalbumin

| GP No. | Sensitizing dose | Interval in days | Temp., °F. | Shock dose | Result | Active phase | or | Until death | Temp. fluctuation, degrees |
|---|---|---|---|---|---|---|---|---|---|
| 356 | 10 mg. M | 25 | 102.9 | 20 mg. N | Minimal | 50 min | | | 102.8–102.7 |
| 357 | 10 mg. M | 25 | 102.8 | 20 mg. N | do | 40 min | | | 102.9–102.7 |
| 359 | 10 mg. M | 25 | 102.8 | 20 mg. N | do | 60 min | | | 103.9–102.8 |
| 365 | 10 mg. M | 25 | 102.4 | 20 mg. N | do | 70 min | | | 103 –102.4 |
| 369 | 10 mg. M | 29 | 102.7 | 10 mg. N | Slight | 90 min | | | 102.9–100.5 |
| 378 | 10 mg. M | 25 | 101.9 | 10 mg. N | Minimal | 75 min | | | 102 –101.4 |

Group D—Sensitized and Shocked With Modified Ovalbumin

| GP No. | Sensitizing dose | Interval in days | Temp., °F. | Shock dose | Result | Active phase | or | Until death | Temp. fluctuation, degrees |
|---|---|---|---|---|---|---|---|---|---|
| 360 | 10 mg. M | 26 | 103. | 20 mg. M | Moderate | 30 min | | | 103 –103.9 |
| | | | | | Fatal | | | 5 hr. 10 min | 102.5– 96.4 |
| 361 | 10 mg. M | 26 | 103.2 | 20 mg. M | Minimal | 55 min | | | 102.5–103.8 |
| 362 | 10 mg. M | 26 | 103.2 | 10 mg. M | do | 55 min | | | 103.2–102.2 |
| 363 | 10 mg. M | 26 | 103. | 10 mg. M | do | 40 min | | | 103.7–103.9 |

TABLE E—Continued

Group A—Sensitized and Shocked With Normal Ovalbumin—Continued

| GP No. | Erythema | Eating | Fur | Surface irritation | Digging hiding | Rectal bleeding | Crying | Dyspnea or rales | Air hunger | Cyanosis | Loss of tonicity | Convulsions | Autopsy findings |
|---|---|---|---|---|---|---|---|---|---|---|---|---|---|
| 351 | | | Rough | xx | x | | | xx | xxx | xxx | x | x | |
| 348 | x | | do | xx | | x | | xx | xxx | x | x | | |
| 349 | | | do | xx | | | | xx | xxx | xxx | xx | x | |
| 352 | x | | do | x | | x | | xx | xxxx | xxxx | xx | xxx | Lungs slightly inflated; slight areas of atalectasis. |
| 350 | | | do | xxx | | | | xx | xxx | xxx | | xxx | Lungs ballooned. |
| 353 | | | do | xxx | | xxx | | xxx | xxxx | xxxx | xxxx | xxxx | Lungs collapsed. |
| 354 | | | do | xx | | x | | xx | xxxx | xxxx | xxx | xxxx | Lungs collapsed; slight areas of atalectasis. |
| 367 | x | | do | xxx | x | x | | xx | xxxx | xxxx | xxxx | xxxx | Lungs slightly inflated. |
| 364 | | | do | xx | x | | | x | xxxx | xxxx | xxxx | xxxx | Lungs slightly inflated; large spot on liver. |
| 370 | | | do | x | | | | x | xxxx | xx | xx | xxxx | Lungs ballooned; small spots on liver. |
| 371 | | | do | xx | | xx | | xxxx | x | xx | xxx | | Lungs collapsed; inflamed. |
| 375 | | | do | xx | x | xx | | x | x | xxxx | xxxx | xxx | |
| 377 | x | | do | xx | | | x | xxxx | x | xxxx | xxx | 0 | Lungs moderately distended; inflamed. |

Group B—Sensitized With Normal, Shocked With Modified Ovalbumin—Continued

| GP No. | Erythema | Eating | Fur | Surface irritation | Digging hiding | Rectal bleeding | Crying | Dyspnea or rales | Air hunger | Cyanosis | Loss of tonicity | Convulsions | Autopsy findings |
|---|---|---|---|---|---|---|---|---|---|---|---|---|---|
| 355 | xxx | | Sleek | xxxx | xxxx | xxx | x | xxxx | | x/x | | | |
| 374 | xx | | do | xx | | | x | xx | | x | x | | |
| 358 | xx | x | do | xxxx | x | | x | xxx | | | | | Chloroformed; organs normal. |
| 366 | xxx | xxx | do | xx | | | x | x | | | | | Chloroformed; 1 lung diseased; few small spots in liver. |

Group C—Sensitized With Modified, Shocked With Normal Ovalbumin—Continued

| GP No. | Erythema | Eating | Fur | Surface irritation | Digging hiding | Rectal bleeding | Crying | Dyspnea or rales | Air hunger | Cyanosis | Loss of tonicity | Convulsions | Autopsy findings |
|---|---|---|---|---|---|---|---|---|---|---|---|---|---|
| 356 | | xx | Sleek | x | xx | x | | x | | | | | |
| 357 | | xxx | do | x | xx | | | x | | | | | |
| 359 | | xx | do | xxx | | xx | x | x | | | | | |
| 365 | xx | xxx | do | x | | | | x | | | | | |
| 369 | | | do | x | | | | x | | x | | | |
| 378 | xxx | xx | Rough-sleek | xxx | x | xx | | xx | | | | | Diarrhea; killed; organs normal. |

Group D—Sensitized and Shocked With Modified Ovalbumin—Continued

| GP No. | Erythema | Eating | Fur | Surface irritation | Digging hiding | Rectal bleeding | Crying | Dyspnea or rales | Air hunger | Cyanosis | Loss of tonicity | Convulsions | Autopsy findings |
|---|---|---|---|---|---|---|---|---|---|---|---|---|---|
| 360 | x / xx | | Sleek / Rough | xxx / x | x | | xx | xx / xx | | x | | xx / x / x | Lungs collapsed. |
| 361 | x | xxxx | Sleek | | x | x | | | xxxx | xxxx | xxxx | x | |
| 362 | xxx | | do | xxx | | | | xx | | | | | |
| 363 | | xx | do | x | | | | | | | | | |

TABLE F
Effect of Secondary Shock on LH Survivors

| GP No. | Previous dosage | Days after 1° shock | Temp., °F. | Shock dose | Result | Active phase or | Until death | Temp. fluctuation, degrees |
|---|---|---|---|---|---|---|---|---|
| 351 A | N/N | 14 | 102.7 | 10 mg. N | Fatal | | 50 min | 102.7–99.9 |
| 348 A | N/N | 19 | 102.8 | 10 mg. N | do | | 28 min | 102.8–100.9 |
| 349 A | N/N | 24 | 102.8 | 10 mg. M | Moderate | Many hours | | 102.1–105.2 |
| 355 B | N/M | 18 | 101.7 | 10 mg. N | Fatal | | 65 min | 101.8–98.4 |
| 356 C | M/N | 18 | 103 | 10 mg. N | do | | 55 min | 103 – 97.8 |
| 357 C | M/N | 18 | 101.7 | 10 mg. N | Severe | Many hours | | 101.9–98.2 |
| 359 C | M/N | 18 | 103.1 | 10 mg. N | Moderate | do | | 103.1–101.2 |
| 365 C | M/N | 18 | 101.9 | 10 mg. N | Severe | do | | 102.5–98.6 |
| 361 D | M/M | 18 | 103.1 | 10 mg. N | Slight | 45 min | | 103.1–103.9 |
| 362 D | M/M | 18 | 102.2 | 10 mg. N | Severe | 110 min | | 102.6–99.5 |
| 363 D | M/M | 18 | 102.7 | 10 mg. N | do | 95 min | | 104 –100.4 |

| GP No. | Erythema | Eating | Fur rough | Surface irritation | Digging hiding | Rectal bleeding | Crying | Dyspnea or rales | Air hunger | Cyanosis | Loss of tonicity | Convulsions | Autopsy findings |
|---|---|---|---|---|---|---|---|---|---|---|---|---|---|
| 351 A | xxx | xx | On face | xx | x | | | xx | xxx | x | xx | xxxx | Lungs collapsed; atalectasis on tips of lobes; spots on liver. |
| 348 A | x | | do | xxx | x | | | xx | xxxx | xxxx | xxxx | xxxx | Lungs moderately distended; organs normal. |
| 349 A | xxxx | xxx | Briefly | xxxx | xx | | x | xxxx | xx | x | | x | Killed; organs normal. |
| 355 B | x | x | xx | x | xxx | | | xx | xxxx | xx | xx | xxxx | Lungs moderately distended; organs normal. |
| 356 C | x | | xx | x | | | | x | xxxx | xxxx | xxx | xxxx | Lungs slightly distended; large spot in liver. |
| 357 C | x | | xxxx | x | x | | x | xxxx | | xx | xx | | Killed; organs normal. |
| 359 C | | | xx | xx | xxx | xx | | xxx | | x | x | x | Killed; small spot on liver. |
| 365 C | xx | | xxxx | xx | | | | xxx | x | xx | xx | | Killed; very large spots on liver. |
| 361 D | x | x | | x | | xxx | x | x | | x | | | Killed; tip of 1 lung diseased; extensive discoloration in liver. |
| 362 D | x | | On face | xx | xx | x | x | xx | x | xxxx | xx | | Killed; slight discoloration in liver. |
| 363 D | | | xxx | xxxx | xx | | x | xx | xxxx | xxxx | xxx | xx | Do. |

TABLE G

Shock Syndrome Produced By Normal or Modified Crystalline Ovalbumin

OVALBUMIN SHOCK IN 8 STRAIN GUINEA PIGS BY ANAPHYLACTIC GROUPINGS

Group A—Sensitized and Shocked With Normal Ovalbumin

| GP No. | Sensitizing dose | Interval in days | Temp., °F. | Shock dose | Result | Active phase | or | Until death | Temp. fluctuation, degrees |
|---|---|---|---|---|---|---|---|---|---|
| 392 I | 10 mg. N | 26 | 102.5 | 10 mg. N | Fatal | | | 34 min | 102.5-101 |
| 393 I | 10 mg. N | 26 | 102.6 | 5 mg. N | Severe | Never recovered | | 9 days | 102.6-100 |
| 403 IV | 10 mg. N | 37 | 102 | 10 mg. N | Fatal | | | 32 min | 102.8-101 |

Group B—Sensitized With Normal, Shocked With Modified Ovalbumin

| 395 II | 10 mg. N | 52 | 102.9 | 10 mg. M | Moderate | Many hours | | | 102.9-104.5 |
| 401 IV | 10 mg. N | 37 | 101.7 | 5 mg. M | Minimal | 50 min | | 14 days | 101.7-103 |
| 402 IV | 10 mg. N | 37 | 102 | 10 mg. M | Slight | 40 min | | | 102 -103 |

Group C—Sensitized With Modified, Shocked With Normal Ovalbumin

| 394 I | 10 mg. M | 26 | 103 | 10 mg. N | Fatal | | | 25 min | 103.1-100.6 |
| 397 II | 10 mg. M | 42 | 103 | 10 mg. N | do | | | 25 min | 103 -102.4 |
| 400 III | 10 mg. M | 52 | 102.8 | 10 mg. N | do | | | 22 min | 102 -103 |
| 404 V | 10 mg. M | 36 | 102.7 | 5 mg. N | Minimal | 35 min | | 13 days | 102.5-103 |
| 405 V | 10 mg. M | 36 | 102.6 | 7.5 mg. N | Fatal | | | 45 min | 102.6-99.2 |
| 406 V | 10 mg. M | 36 | 102.9 | 10 mg. N | do | | | 25 min | 103.2-102 |

Group D

| 396 II | 10 mg. M | 42 | 102.9 | 10 mg. M | Slight | 60 min | | | 102 -103.2 |
| 398 III | 10 mg. M | 52 | 102.5 | 10 mg. M | do | Many hours | | | 102.5-103.8 |
| 399 III | 10 mg. M | 41 | 102.3 | 10 mg. M | do | 60 min | | | 101.5-102.5 |

Group A—Sensitized and Shocked With Normal Ovalbumin—Continued

| GP No. | Erythema | Eating | Surface irritation | Digging hiding | Rectal bleeding | Crying | Dyspnea rales | Air hunger | Cyanosis | Loss of tonicity | Convulsions | History after shock or autopsy findings |
|---|---|---|---|---|---|---|---|---|---|---|---|---|
| 392 I | | x | xxx | | | | xx | xx | xx | | xxxx | Lungs distended; slight atalectasis and edema. |
| 393 I | | | xx | xx | | | xxx | xx | x | xx | | Lived 9 days without recovering normal respiration or appetite. |
| 403 IV | x | | xxx | x | | | x | xxx | xx | xxxx | xx | Lungs ballooned. |

Group B—Sensitized With Normal, Shocked With Modified Ovalbumin—Continued

| 395 II | | x | xxx | | | | x | xx | x | | | Recovered; healthy. |
| 401 IV | xxx | xx | x | | | x | x | | | x | | Recovered; slowly developed degenerative condition; died on 14th day. |
| 402 IV | x | x | | | | x | x | | | x | | Recovered but for chronic fever. |

Group C—Sensitized With Modified, Shocked With Normal Ovalbumin—Continued

| 394 I | | | xxx | | | | xxx | xxxx | xx | | xxxx | Lungs distended; few spots on liver. |
| 397 II | | | xxxx | x | | | xxx | xxx | xxx | xxxx | xxxx | Lungs ballooned; many spots on liver. |
| 400 III | | | xx | | | | xxx | x | xx | | xxxx | Lungs ballooned; few hemorrhages. |
| 404 V | | xxx | | | | | xx | | x | | | Recovered; degenerative condition appeared on 5th day; died on 13th day. |
| 405 V | | x | xxxx | x | | x | xx | xxx | xxx | xx | xxxx | Lungs partially distended. |
| 406 V | | | x | | | | xx | xxx | xxxx | x | xx | Lungs ballooned; several spots on liver. |

Group D—Continued

| 396 II | xxx | xxx | x | x | | | xx | | | | | Recovered. |
| 398 III | x | | xx | | | | x | | | | | Do. |
| 399 III | xx | xx | x | | | x | | | x | | | Do. |

TABLE H

*Secondary Shock in Survivors of MF Strain*

| GP No. | Previous treatment | Shock dosage | Days after 1° shock | Temp., °F. | Shock dose | Result | Active phase | Days till sacrifice | Temp. change, degrees |
|---|---|---|---|---|---|---|---|---|---|
| 369 | None | M/N | 16 | 102.5 | 10 mg. N | Severe | Many hours | 28 | 102.5–100.3 |
| 386 | A and B | N/M | 19 | 103.5 | 10 mg. N | Slight | 57 min | 9 | 103.5–100 |
| 387 | A and B | N/M | 19 | 103.6 | 10 mg. M | Minimal | 50 min | 9 | 103.6–101.6 |
| 390 | A | N/M | 23 | Not taken | 10 mg. N | do | 60 min | 9 | 103 –102.4 |

| GP No. | Erythema | Eating | Surface irritation | Digging hiding | Rectal bleeding | Dyspnea rales | Miscellaneous | Air hunger | Cyanosis | Loss of tonicity | Convulsions | Autopsy findings after death by concussion |
|---|---|---|---|---|---|---|---|---|---|---|---|---|
| 369 | x | xx | xxx | x |  | xx | Climbing |  | xx | xx | x | Blood and tissues normal in color; all organs normal in color and gross structure; lungs normal, collapsed. |
| 386 |  |  | x |  |  | xx | Alarm |  | x |  |  | Blood and tissues normal in color; all organs normal in color and gross structure; lungs well aerated, slight local engorgement on pleura. |
| 387 | x | xxx |  |  |  | xx | Shivering |  |  |  |  | Blood and tissues normal in color; all organs normal in color and gross structure; few light yellowish areas on surface of liver; lungs normal, collapsed. |
| 390 | x |  | x | x |  | xx | Alarm |  |  |  |  | Blood and tissues normal in color; all organs normal in color and gross structure; large, pale, superficial areas on liver; lungs aerated and moderately engorged on pleura and in interior. |

Sensitization to shock depends upon genetic factors, and strains of guinea pigs differ in degree of sensitivity to particular anaphylactogens. The LH strain has been inbred for about 15 years from an original herd of 100. The MF and S strains have each been inbred from a single pair for 13 years. The S strain shows a marked resistance to foreign globulins, but unusual sensitivity to albumins. All animals used were albinos.

The differing effects of modified and normal antigens appear most obviously when the temperature readings are recorded every 5 minutes and every symptom noted. Each animal in shock is observed closely for one hour, and hemobiological slides are made before and after shock. By classifying and tabulating the symptoms as shown in the tables, I have found that the effects of protracted shock from normal ovalbumin relate to anoxia of the tissues. The guinea pigs of LH strain, all males, which had no protective treatment, showed the most typical syndrome (Table E).

As soon as the shock dose is administered, the animal, which has been fasting for 24 hours, is placed in a cage with fresh lettuce. It does not eat, but sits quietly staring. It rubs its nose and ears, or scratches with its hind foot (surface irritation), begins to pant (dyspnea), scratches the floor of the cage or pokes its head under the lettuce (digging and hiding), occasionally displays alarm by circling rapidly. These symptoms are brief and transitory. Its coat becomes rough and cannot be smoothed. At about 20 minutes the fatal symptoms begin, sometimes with a convulsive kick. The ear veins turn blue. The breathing deepens, and the animal stretches its neck and throws back its head in a typical gesture (air hunger). Choking and rales may occur, and the guinea pig moves restlessly and uncomfortably, sometimes trying to hide its eyes from light. In the last 10 minutes the entire skin, particularly the ears, turns a bluish shade, due to cyanosis, the muscles become increasingly limp, the animal lies prostrate, taking slow, gasping breaths, develops convulsions and dies. Sometimes strangulation cuts short the terminal symptoms. The temperature may fall 5° or 6°.

In guinea pigs which received one or both doses of modified ovalbumin, only the primary symptoms developed. A sensitizing period of 25 days and sensitizing and shock doses of 10 mg. were the conditions found to produce fatal shock with normal antigen. When similar conditions were maintained with modified antigen, shock was slight and the symptoms superficial. Animals in group C sensitized with modified antigen and given 20 mg. of normal ovalbumin experienced minimal shock syndrome. If the modification process had merely destroyed a large part of the protein, these animals would have died.

Two animals which received a shock dose of 20 mg. of modified antigen experienced severe reactions. No. 355 which had been sensitized with the normal antigen (Table E, group B), scratched until it fell on its side repeatedly, tore constantly at its mouth with its hind claws and exhibited bright red erythema on its skin and exposed parts. It had severe dyspnea throughout the reaction, but did not once display air hunger.

No. 360, sensitized with modified ovalbumin (Table E, group D) reacted to the shock dose much as other guinea pigs did in the same dosage (group D), except that its ear veins turned slightly bluish and it kicked twice in 5 minutes. It apparently recovered, lay quietly for about 10 minutes, and then went into a second and different phase, with alternating apearance of cyanosis and erythema, bristling and smooth fur, loss and recovery of muscle tone. After 5 hours it displayed abdominal tenderness, vomiting, white extremities and extreme prostration and weakness, but died without convulsions. No. 361 (Table E, group D) survived an equal dose with almost no symptoms. It is probable that in No. 360 the massive dose of antigen exhausted antibody and permitted a gradual accumulation of biochemical imbalances. This experiment demonstrated that modified ovalbumin is strongly antigenic.

The 3 other animals in group D of Table E illustrate that the toxicity of the antigen has been greatly decreased. The fact that shock occurred in the animals in groups C and D proves that antigenicity had not been altered. A slight chemical change, even the addition of a single side chain, during the modification process, would have altered the antigen so that a different antibody would have been evoked. In that event, there would have been shock in groups A and D, but not in groups B and C.

Following recovery from sublethal primary shock a guinea pig for the next month is in a state of enhanced sensitivity. Between the second and third week, death from the normal antigen is said to be almost invariable, as shown in secondary shock experiments on No. 351 and No. 348, Table F. The eleven LH guinea pigs which survived the experiments listed in Table E were subjected to secondary shock, as recorded in Table F, those which had received modified ovalbumin all being injected on the 18th day. Two of this group died, one of which was No. 355, which had severe primary shock. The other, No. 356, had a large spot on the liver. These pale areas may be fatty infiltrations or abscesses and were not identified by culture. As shown in Table F, the 7 remaining animals survived secondary shock. If the original modified dose had not exerted a protective effect, No. 357, No. 359 and No. 365 would certainly have died.

This group of 3 animals should also include No. 369, an LH male used as contrast in experiments on MF strain (Table H) which had been protected with modified blood constituents. The group of 4 LH guinea pigs which received the M/N/N dosage all showed a partial development of the second stage or fatal symptoms of classical anaphylaxis, fluctuating over a period of many hours which extended into the night. They displayed intermittent cyanosis, loss of muscle tone, rapid, deep, hard breathing and abdominal tenderness. All were lively and normal on the following day.

No. 349 (Table F) received the N/N/M dosage and responded with chills and fever, which suggested that inflammation was being discharged from the tissues, resulting in a permanent impairment of the mechanism of tissue respiration. This phenomenon appeared also in experiments on S strain (Table G).

Four animals, No. 358, No. 366, No. 364 and No. 367 (Table E, group B and A) received sensitizing doses of 100 mg. of normal ovalbumin. When shock is administered by the intravenous route, a massive sensitizing dose will prevent fatal primary anaphylaxis. In the experiments with intraperitoneal shock, the large sensitizing dose did not seem to exert any blocking effect.

Table G records the results of experiments made with the S strain of guinea pigs. Five litters of 4 males each were used. No difference in resistance between litters was detected. The unusual sensitivity of this strain to albumin was demonstrated by the fatal results in group C. This experiment illustrates that modification has not changed antigenicity of the antigen.

Three animals in this group exhibited what appeared to be degenerative changes due to shock. No. 393, given sublethal N/N shock, never recovered. It displayed permanent dyspnea, anorexia and alarm and died after 9 days. No autopsy was performed. No. 401 died of a slowly developing morbidity with respiratory distress and at autopsy, evidence of pathology of lungs, liver, stomach and intestine. No. 404 developed identical symptons, with the addition that its eyes exuded pus. Its fever was 106° F.

S strain guinea pigs in secondary shock were not protected by modified albumin, but during fatal anaphylaxis developed a wheezing sound in their bronchials, similar to the asthmatic syndrome. It is believed that ovalbumin shock may convert the animals' albumin to a pathologic form, and that the use of modified ovalbumin may induce a chronic state. Asthma has never been produced in experimental animals, and my findings make available a new means of laboratory work upon the problem.

The blood of allergic patients in hemobiological slides invariably becomes liquified, suggesting some change in the plasma proteins. This change appears progressively in the blood of guinea pigs during sensitization.

Experiments with ovalbumin shock in a group of MF female guinea pigs were combined with the additional factor of protection against shock with modified blood proteins. Eleven guinea pigs were treated for a month, as shown in Table I. A sensitizing dose of 10 mg. of normal ovalbumin was given in the final week (Table D).

The modified substances used were: bovine albumin, globulins and fibrinogen, also histamine and guinea pig hemoglobin. All were used in the 50th dilution. This dosage apparently had no effect on primary shock, but the difference appeared in secondary shock (Table H).

TABLE I

*Treatment of Eleven Female Guinea Pigs of MF Strain*

*Dosage A.*—Modified histamine, bovine albumin, globulins, fibrinogen, modified guinea pig hemoglobin.
*Dosage B.*—Modified equine cytochrome C.
Dosage A administered orally in 50th dilution every 3 days from 8/19 to 9/16, 4 weeks. Dosage B administered orally, 3 doses in 50th dilution, between 9/8 and 9/16. Sensitizing dose of 10 mg. normal ovalbumin injected intraperitoneally 9/8. Shock dosage 10 mg. each, normal or modified ovalbumin as indicated.

| GP No. | Dosage | 9/8 | 10/7 | 10/14 | 1° shock | Interval, (days) | Result | Interval, (days) | 2° shock |
|---|---|---|---|---|---|---|---|---|---|
| 380 | A and B | N | | | 9/28 N | 20 | Fatal | | |
| 381 | A | N | A | A | 10/20 N | 42 | do | | |
| 382 | A and B | N | | | 9/28 N | 20 | do | | |
| 384 | A and B | N | A and B | A and B | 10/20 M | 42 | Minimal killed | | |
| 385 | A and B | N | | | 9/29 M | 21 | Slight | 16 | 10/15 M. |
| 386 | A and B | N | 0 | 0 | 10/1 M | 23 | Minimal | 19 | 10/20 N. |
| 387 | A and B | N | 0 | 0 | 10/1 M | 23 | do | 19 | 10/20 M. |
| 388 | A and B | N | A and B | A and B | 10/20 N | 42 | Fatal | | |
| 389 | A and B | N | 0 | 0 | 10/1 N | 23 | do | | |
| 390 | A | N | 0 | 0 | 10/1 M | 23 | Slight | 23 | 10/24 N. |
| 391 | A | N | A | A | 10/20 M | 42 | Minimal killed | | |

Autopsies on the last 8 animals listed in Table I were made and tissue sections prepared from the shock organs. In guinea pigs which died of classical shock, both blood and tissues were cyanosed. No. 384 and No. 391, which had received a shock dose of modified ovalbumin and survived, were killed by concussion. Their blood was cyanosed, but organs and tissues were normal in color and gross structure.

Four survivors were given secondary shock, as shown in Table I. All survived and were killed by concussion. The blood was bright red and the tissues and organs of normal color. The 3 MF guinea pigs which had received modified blood constituents had displayed almost no shock syndrome, apparently not sufficient to reduce their hemoglobin. The administration of cytochrome C apparently did not contribute to protection, since No. 391 did not receive it.

Fever and inflammation of the pleura in this group were due to the fact that they were transported on an hour's trip for demonstration. Lesions on the liver were not identified. Histologic studies showed normal tissues in all animals which survived. One animal which died in shock showed demonstrable changes in the adrenal gland.

These experiments demonstrate that the modification process which I have invented affords a new opportunity for the study of hypersensitivity in the medium of anaphylactic shock.

Even more striking are the results of experiments involving animals, all of which had received a sensitizing dose of normal ovalbumin, followed by a shock dose of my modified ovalbumin and a further shock dose of normal ovalbumin. Two animals (#386 and #390, Table H) received modified blood proteins, as shown in Table I, prior to administration of ovalbumin. Two other animals, #355 (Table F) and #374, had not received the modified blood proteins.

As shown in Table H, #386 and #390 exhibited only slight reaction to the secondary shock dose. #355 and #374, however, exhibited a violent reaction and died within 65 minutes and 40 minutes, respectively.

This comparison shows that the modified blood proteins afforded effective protection against the specific antigen in the period of extreme sensitivity following primary shock.

Sensitization remains one of the principal problems of modern medicine. There are few techniques to aid in the understanding of the subject. During only the past 15 years life expectancy has been greatly increased by the development and use of new drugs and antibiotics, but the same measures have greatly increased the number of allergic patients and of the allergens to which they are sensitive. Diabetics become sensitized to insulin. Penicillin sensitivity alone causes hundreds of deaths a year. Bacterial allergy, naturally acquired or from the use of unmodified vaccines, causes hypersensitive states that are practically untreatable.

A recent study has shown that when rats are treated for a period of weeks with one of a number of drugs in common pharmacologic use, including some of the hormones, damage is done to the hypothalamus from which the rat never recovers. The hypothalamus, or mid-brain, is the location of many control centers, and damage to it is manifested by cyclic manifestations in the animals' moods and in their behavior patterns in eating, drinking, sleeping and mating. Damage is also demonstrable on autopsy.

The use of my hemobiological techniques and modified bacterial and biochemical agents opens a new opportunity for observing the interrelationship of the complex factors of disease and health, and for the management in vivo of immunologic response.

The following examples demonstrate the usefulness of my modification method in elucidating the mechanism of immune response and in demonstrating new methods for evoking it in such a way as to promote resistance and healing in vivo, especially in chronic states. When referring to various dilutions I mean a concentration which may be expressed at $10^n$, where $n$ is the number of the dilution. Thus the first dilution is 1:10, the eighth is 1:100,000,000, etc.

EXAMPLE I

A modified vaccine was prepared from a virulent strain of *Brucella abortus*. A suspension of whole cells was heated for 22 hours at 60° C. A similar suspension was heated for 6 hours at 60° C. and disrupted by ultrasound. The toxoid thereby obtained was added to the vaccine. The combined preparation was diluted to approximately 5 billion organisms per cc. This preparation was injected into a healthy cow. The dosage was as follows:

| | Ml. |
|---|---|
| Nov. 18, 1949 | 2 |
| Nov. 22, 1949 | 5 |
| Jan. 16, 1950 | 5 |

There was at all times no evidence of toxicity or anaphylactic shock.

EXAMPLE II

The preparation of Example I in a dilution of 4 billion organisms per ml. was used in field trials on 15 cows with active Bang's disease, proved by agglutination titre and positive milk cultures. Five similarly diseased but untreated animals were subjected to concurrent agglutination tests as controls. The experiments were planned by New York State Veterinary College along conventional lines to test the effect of a modified agent directed at the specific infection and use in massive dosage. The majority of animals showed a reduction in titre 1 month after treatment, but in 2 animals other infections were present and advanced to the point where the animals were destroyed as useless. All injections were given subcutaneously.

The experiment indicates that antibody could be exhausted by massive dosage and that no permanent results in the chronic state could be obtained by the modified specific agent alone.

EXAMPLE III

A 2-year heifer, vaccinated as a calf with Strain #19, developed typical Bang's disease. She was treated with immunotransfusion, with the blood of a healthy cow vaccinated in vitro, followed by a course of chloromycetin, but the titre of 1:200 persisted without clinical improvement.

Brucella vaccine and toxoid, oxidized and heat modified by my method was given subcutaneously as follows: 1 ml. and 1.5 ml. in 2 successive doses, after which the titre was 1:100. A small daily dose was given for the following week. The titre then dropped to 1:50 and remained.

EXAMPLE IV

A polyvalent vaccine of several of the known etiologic agents of mastitis, viz. *E. coli*, *Straphylococcus aureus hemolyticus*, and *Streptococci zooepidemicus*, *agalactiae*, and *uberis*, was oxidized and heat modified. No toxoid had been prepared. Five ml. containing 5 billion organisms per ml. were injected intramuscularly into an animal suffering from acute mastitis of 48 hours' duration. In 24 hours the udder was again soft and in 48 hours it was practically normal. The animal remained well.

This experiment showed that in recent, acute infection, a modified vaccine against the invasive factor of the etiological agent was effective.

I have also found my modified substances to be useful in the treatment of other animals such as dogs, as the following examples show.

EXAMPLE V

A Shetland Sheep dog, 9 years old, had a streptococcal infection at 4 years, nephritis at 7 years, and after 2 years more, he could urinate with evident pain only a few drops at a time, vomited 3 or 4 meals a week, had no appetite, an enlarged prostate, and a belly raw with dermatitis which kept him continuously scratching. He had cataract in both eyes and could hardly go downstairs unaided. An acute illness with fever and prostration caused the veterinarian to recommend that he be destroyed.

I made a heat-modified vaccine from a strongly chromogenic Staphylococcus isolated from his vomit. After the third injection, the itching stopped and the lesions on the belly healed. An oxidized, heat-modified vaccine was then used, and digestion, urination and appetite returned to normal. He had what appeared to be a focal response from the sinus. He panted a good deal, drank unusual quantities of water and slept most of the time but after several weeks appeared fairly well. Gradually the cataracts cleared, and his vision seemed to give no trouble up to the time of his death, nearly 4 years later.

EXAMPLE VI

A beagle puppy, 6 weeks old, had been given raw meat. The membranes of mouth, eyes and ears were much inflamed, lymph glands were swollen and had ruptured externally. There was practically no pus. Cultures obtained by scraping and probing the lesions grew only *Straphylococcus albus*. Fungus cultures were negative. Brucella infection was diagnosed clinically and by hemobiological slides. The dog had grown worse under penicillin treatment, but when mixed vaccines and toxoids prepared by my method from Straphylococcus and Streptococcus canis, *Brucella abortus*, and *E. coli* in 7th dilution were given orally, it cleared up completely in 2 weeks.

EXAMPLE VII

A terrier, 13 years old, was senile, practically blind from cataract, its kidneys almost non-functioning, and covered with dermatitis. The veterinarian did not expect it to live more than 3 days. It was given substances modified by my method in approximately the 30th dilution, including vaccines and toxoids of *Straphylococcus aureus* canis, *Streptococcus hemolyticus* canis, *E. coli*, *Brucella abortus*, acetylcholine, eserine, choline esterase, glucuronic acid, histamine, the amino acids, uric acid, urea, vitamins, adrenal and sex hormones. It was treated orally for about 6 months and made what appeared to be a complete recovery.

I have found that bacterial substances modified in accordance with my invention exhibit a striking utility when used to produce advanced pathology by inducing protracted morbidity. This method offers an opportunity to study a little-known factor in human disease such as pathology due to toxins absorbed from a distant focus such as the sinus or intestinal tract.

I isolated a short-chain Streptococcus from the lungs of an RF guinea pig, dead of pulmonary infection, and made a vaccine therefrom by my four step method disclosed above. This vaccine was administered to a female guinea pig of the RF strain, a breed which has proved to be a carrier of *Streptococcus C*. This low grade infection, non-pathogenic for humans, impairs the usefulness of the animal for research. The infection is manifested as a pulmonary disease, often fatal, or in chronic form, commonly a lymphadenitis. The animal treated was one of 6 females received in a lot; 2 of the animals had died of respiratory disease, one on arrival and one shortly thereafter. The animal in question had developed acute respiratory symptoms and was near death. Her supply of antibody was apparently near exhaustion. She was treated with the 20th dilution of the modified vaccine prepared as stated above, with which was combined albumen, globulin, fibrinogen, histamine, and strontium, all modified by my method. Before treatment she ran a temperature above 103° F., an established symptom of disease in guinea pigs. The preparation was administered to the animal every few days. The animal lived for six weeks and in the last week appeared to eat nothing and was in a state of extreme weakness and respiratory difficulty. On autopsy she exhibited a condition of advanced pathology such I had never seen in cases of naturally occurring death. The whole chest cavity was necrotic; the heart enlarged to 3 or 4 times the normal size, was a thin walled sac easily punctured by slight pressure, the blood was thin and dark; the lungs almost completely atrophied with alatectasis; the liver was dark and mottled.

In several other animals in extremis, by employing this mode of treatment I have been able to prolong morbidity and develop advanced pathology. This may also be accomplished by using the 8th dilution, which apparently exhausts antibody. It is possible that the use of a modified vaccine retards the invasiveness of the infection and that pathology is due to the toxins, for which no toxoid was used.

A group of 8 RF male guinea pigs developed respiratory disease 5 weeks after receipt. They were treated only with a *Streptococcus C* vaccine modified according to my invention and appeared to recover. In the fifth month four survivors were again ill; two were destroyed and the other two were again successfully treated. The results are summarized in the following table.

TABLE J

*Immunizing Treatment of RF Strain Guinea Pigs With Streptococcus C Autovaccine on Eight Males*

[Temperatures (° F.) on dates of experiments]

| GP No. | 10/16 | 10/21 | 10/11 | 11/23 | 11/30 | 12/6 | 12/16 | 12/29 | 1/8 | 1/10 | 1/15 | 1/21 | 2/20 | 3/8 | 3/20 | 4/11 | 4/22 | 5/22 |
|---|---|---|---|---|---|---|---|---|---|---|---|---|---|---|---|---|---|---|
| 297 | [1] 103.3 | | 102.2 | [1][2] 103.6 | [3] 102 | | | | | | | | | | | | | |
| 298 | [1] 104.4 | | 102.6 | [1][2] 102.3 | | | | | | | | [3] 101.8 | | | | | | |
| 299 | [1] 103.2 | 101 | 102 | [1][2] 103.2 | | 102 | 101.9 | | | | 101.8 | | 101.6 | 101.6 | ([1][4]) | 100.8 | | ([3]) |
| 300 | [1] 104 | | | [1] 102 | | 102 | [3] 103.2 | | | | | | | 100.1 | [3] 102.4 | | | |
| 301 | [1] 102.9 | 101.3 | | [1][2] 104 | | [3] 103 | | [3] 103 | | 102 | | 101.7 | 101.6 | | Lymphadenitis [3] ([1][4]) | | | |
| 302 | [1] 103.4 | 102.2 | | [1][3] 102.6 | | 102.2 | [1] 102.7 | 101.8 | 100.6 | | | | | 100.8 | 101.3 | | [3] 101.3 | |
| 303 | [1] 103.6 | 102.3 | | [1][2] 103.2 | | 104.5 | | | | | 101.5 | | [3] 102.4 | | | | | |
| 304 | [1] 102.6 | 101.7 | | [1][2] 102.2 | | 101.8 | | 102.6 | 100.2 | | | | | 100.6 | Acute [1][2] | | | |

[1] Pulmonary symptoms.  [2] Vaccine given.  [3] End of experiment, animal died in shock or was chloroformed. Animal not used for experiment with temperature over 102.4° F.  [4] Supplementary treatment with modified fibrinogen, globulin, albumin, histamine, acetylcholine, glucuronic acid.

I have also discovered that protein synthesis in vivo may be induced by the administration of proteins modified by my method. In experiments with albumin, I have found that younger guinea pigs experience a greater increase than do older animals. In the tables below, normal and modified albumin were given in a dosage of 2 drops (0.1 ml.) orally in the 8th dilution. An average total serum protein (T.S.P.) of eight untreated, healthy guinea pigs weighing between 300–500 gm. had been found to be 4.71 gm. percent.

TABLE K

| GP No. | Dose | Interval (days) | Clinical state | T.S.P. at 10th day (gram-percent) | |
|---|---|---|---|---|---|
| 264f | 1 normal | 10 | healthy | 5.2 | |
| 265f | do | 10 | do | 5.4 | |
| 267m | do | 10 | lymphadenitis | 5.5 | |
| 262f | 1 modified | 10 | healthy | | 7.6 |
| 263f | do | 10 | do | | 6.4 |
| 274m | do | 10 | lymphadenitis | | 6.6 |
| Average | | | | 5.37 | 6.87 |

TABLE L

| GP No. | Dose | Interval in days | T.S.P. (days) | | | | |
|---|---|---|---|---|---|---|---|
| | | | 0 | 9¾ | 10 | 11 | 11½ |
| 235f | 0 | 0 | 5 | | | | |
| 235f | 1 modified | 9¾ | | 5.5 | | | |
| 259f | do | 10 | | | 5.4 | | |
| 239f | do | 10 | | | 5.3 | | |
| 236f | do | 10 | | | 6.15 | | |
| 236f | do | 11 | | | | 6.4 | |
| 237f | do | 10 | | | 5.6 | | |
| 237f | do | 11 | | | | 5.35 | |
| 238f | do | 11 | | | | 5.5 | |
| 302m | do | 11 | | | | 6.1 | |
| 301m | do | 11 | | | | 6.2 | |
| 235f | 1 normal | 9¾ | | 5.45 | | | |
| 259f | do | 10 | | | 5 | | |
| 239f | do | 10 | | | 5 | | |
| 236f | do | 10 | | | 5.9 | | |
| 236f | do | 11 | | | | 5 | |
| 237f | do | 10 | | | 5 | | |
| 238f | do | 11 | | | | 4.3 | |
| 301m | do | 11 | | | | 6.03 | |
| 301m | do | 11½ | | | | | 6.05 |
| Average T.S.P. for modified dose | | | | | | 5.61 | 5.71 |
| Average T.S.P. for normal dose | | | | | | 5.2 | 5.2 |

The results with the smaller animals given in Table K show that those treated with modified albumin had a total serum protein of 6.87 gm. percent, as contrasted with 5.37 gm. percent for those dosed only with normal albumin, or 28% greater.

The larger animals (Table L) demonstrated a somewhat lesser, although striking, increase in total serum protein. Those tested 10 days following administration showed totals of 5.61 gm. percent for modified albumin as compared with 5.2 gm. percent for unmodified, and on the 11th day, 5.71 gm. percent as against 5.2 gm. percent; 8% and 10% greater, respectively.

These results are believed to be the first demonstration in vivo of the principle of reversibility of enzyme action. It is known that protein synthesis is essential to the life process. My modified substances accordingly provide a valuable means of laboratory study of the mechanism of protein synthesis in blood.

I have further found that, surprisingly, minerals may be modified by the method of my invention above related. They exhibit the same clumping activity during the ion exchange step of my method as shown by the fibrinagglutination technique. The effectiveness of these modified minerals is believed related to the catalytic effect of minerals in the body.

Strontium was modified by my method by treating with pepsin for 16 hours, $H_2O_2$, heating for 17½ hours at 58° C., and contacting with ion exchange resins for 8 days, 6 hours and 39 minutes. The total serum protein of guinea pigs was determined before and after administration of the modified strontium (in the 8th and 60th dilutions). The results are summarized in Table M.

TABLE M

*Determinations of Total Protein (gm. percent) on Sera of Guinea Pigs Treated With Normal or Modified Strontium*

8TH DILUTION

| GP No. | Weight during experiment, gm. | Interval in days after dose | Total protein | |
|---|---|---|---|---|
| | | | Modified | Normal |
| 287 | 631 to 730 | 10½ | 6 | 4.8 |
| 288 | 692 to 729 | 11 | 6.5 | |
| 299 | 284 to 802 | Baseline | | 4.6 |
| | | 10 | 5.7 | |
| | | 10½ | 5.2 | |
| | | 11 | 5.1 | |
| 304 | 404 to 740 | 11 | 5.9 | 5.9 |
| | | 11½ | | 6.3 |

60TH DILUTION

| GP No. | Weight during experiment | Number of doses | Interval in days after last dose | Total protein | |
|---|---|---|---|---|---|
| | | | | Modified | Normal |
| 299 | 1,000+ gm | 1 | 10 | 5.5 | |
| 315 | From 3 wks. to 534 gm. | 22 in 6 wks. | 28 | | 5.1 |
| 317 | From 3 wks. to 520 gm. | 22 in 6 wks. | 28 | 5.7 | |
| 323 | 263 to 505 gm | 18 in 7 wks. | 0 | | 5.15 |

It will be seen that the modified strontium had a very significant and marked effect upon protein synthesis of the animals to which it was administered. A deficiency in protein synthesis may thus be adjusted by the practice of my invention.

A further study was made on strontium deposition in the femurs of guinea pigs. Strontium in bone is known to be in a state of continuous replacement. In the rat increased deposition appears within 20 days when excess strontium is fed. During my studies, it became evident that the metabolic instability of the guinea pig affects its capacity to deposit strontium. The normal for the two strains RF and MF, appears to be between 0.06% and 0.07%. Fetal strontium is normally lower than adult strontium. Since bone strontium in the guinea pig seems to be more labile than that of other species, factors which affect increase and decrease may be studied.

A solution of unmodified strontium hydroxide was prepared in a concentration of 30 mg. per ml., and a solution of comparable density was made of strontium modified in accordance with my invenion. The 8th dilution was prepared of each, and this strength was used for all treatment of experimental animals, unless otherwise indicated. Treatment was given by mouth, 2 drops (0.1 ml.) constituting a dose. When "conc. Sr" is referred to in Tables N and O, it indicates a concentration of 30 mg. per ml.

Strontium enters the body mainly from dietary sources. Prepared feed used by breeders and in my laboratory contains only traces of strontium. Unwashed lettuce and other vegatables are given daily at my laboratory, but at the farm where RF guinea pigs are raised, they receive lettuce only once a week. MF guinea pigs receive it several times a week. The rate of strontium deposition in young animals depends in part on dietary sources.

Differences in increase in young animals are illustrated in Table N by two obtained directly from the breeder of the RF strain, No. 318 and No. 319, compared with No. 308 and No. 309 of MF strain, bred and raised in my laboratory from a dam which had been dosed with modified strontium in the 8th dilution approximately every 3 days throughout pregnancy. The MF strain is in general more resistant to disease than the RF strain.

Seven RF female guinea pigs, received from the breeder at approximately 6 weeks of age, were maintained on my laboratory diet for 6, 10 or 12 weeks without treatment of any kind. All exhibited fever during a part or all of the interval under observation, and all exhibited some evidence of chronic lesions during life or at autopsy. Two died of pulmonary disease, 5 were chloroformed. The femurs were retained and the percent strontium of the bone ash was determined. In two cases separate determinations were made on each femur. In all cases the total strontium was below normal levels.

TABLE N

*Experiments in Strontium Deposition in Bones of Healthy Guinea Pigs Treated With Normal or Modified Strontium*

| GP No. | Sex | Treatment | Duration | Number doses | Total dosage | Incubation period | Date of death | Age at death | Percent SR in bone ash | Comments |
|---|---|---|---|---|---|---|---|---|---|---|
| 318 | M | None | | | | | 4/2 | 4 wk | 0.046 | Received from farm at 4 wk., RF strain. |
| 319 | M | do | | | | | 4/2 | 9 wk | 0.033 | Received from farm at 9 wk., RF strain. |
| 297 | M | do | | | | | 11/30 | 12 wk | 0.07 | Received from farm at 6 wk., RF strain. |
| 303 | M | do | | | | | 2/8 | 18 wk | 0.06 | Had been used in anaphylaxis experiment, RF. |
| 281 | F | Modified Sr | 9/1–10/13 | 20 | .06 µg | 19 days | 11/1 | 5 mo | 0.07 | MF strain, bred to #252, also MF. Litter born 10/13, weaned 11/1. |
| 305 | M | Modified Sr | 12/11–2/16 | 33 | .1 µg | 0 | 2/16 | 18 wk | 0.055 | From 10/13 litter of #281. |
|  |  | Normal Sr, conc | 12/11–2/16 | 33 | 105 mg | 0 |  |  |  |  |
| 306 | M | Modified Sr | 12/11–2/8 | 29 | .087 µg | 0 | 2/8 | 17 wk | 0.06 | Do. |
| 307 | M | do | 12/11–2/16 | 33 | .1 µg | 0 | 2/16 | 18 wk | 0.07 | Do. |
| 282 | F | do | 9/1–10/13 | 20 | .06 µg | | | | | Littermate of #281, bred to #252, MF. Litter born 10/14, weaned 11/1. |
|  |  | do | 1/23–4/8 | 35 | .105 µg | 3 days | 4/11 | 10½ mo | 0.031 | Litter born 4/8; septic parturition, fever 104.5° F; chloroformed. |
| 308 | F | do | 10/18 | 1 | .003 µg | 20 days | 11/7 | 3 wk. 3 da | 0.05 | From 10/14 litter of #282. |
| 309 | M | do | 10/18 | 1 | .003 µg | 54 days | 12/11 | 8 wk. 2 da | 0.06 | Do. |
| 320 | M | None | | | | | 4/8 | At birth | 0.013 | From 4/8 litter of #282; chloroformed 2 littermates died on 2nd day after birth. |
| 235 | F | Modified Sr | 6/24–8/18 | 12 | .036 µg | | | | | RF strain, bred to RF male. Litter born 9/26, weaned 10/20. |
|  |  | Normal Sr | 8/23–9/2 | 4 | 1.2 µg | | | | | |
|  |  | Modified Sr (heat-modified beyond optimum for GP blood). | 1/15–4/9 | 42 | .126 µg | | 4/9 | 1 yr. 8 mo | 0.042 | In late pregnancy, evidence of disease and lack of fetal life; died with slight respiratory infection; other organs normal; 4 normal, full-grown fetuses. |
| 294 | F | Modified Sr | 9/28–10/25 | 12 | .036 µg | 5 wk. 6 da | 12/4 | 9 wk. 6 da | 0.08 | From 9/26 litter of #235. |
|  |  | Normal Sr, conc | 11/4 | 1 | .3 mg | 4 wk. 2 da |  |  |  |  |
| 295 | M | Normal Sr | 9/28–10/25 | 12 | .036 µg | 5 wk. 6 da | 12/4 | 9 wk. 6 da | 0.055 | Do. |
|  |  | Normal Sr, conc | 11/4 | 1 | .3 mg | 4 wk. 2 da |  |  |  |  |
| 296 | M | Modified Sr | 9/28–10/25 | 12 | .036 µg | 5 wk. 6 da | 12/4 | 9 wk. 6 da | 0.07 | Do. |
|  |  | Modified Sr, conc | 11/4 | 1 | .3 mg | 4 wk. 6 da |  |  |  |  |
| 252 | M | Modified Sr | 1/23–2/23 | 15 | .003 µg | | | | | |
|  |  | Normal Sr | 2/23–3/6 | 6 | 18 mg | | | | | |
|  |  | Modified Sr | 4/4–4/24 | 10 | .03 µg | | | | | |
|  |  | do | 4/24–5/18 | 8 | 60th dil | 21 days | 6/8 | 1 yr. 5 mo | 0.06 | MF strain, bred to #281 and #282. |
| 288 | M | Normal Sr | 2/28–4/22 | 27 | .081 µg | 0 | 4/22 | 8 mo | 0.088 | Bled 3x for total protein, 5 cc. each. |
| 302 | M | Modified Sr | 2/28–4/22 | 27 | .081 µg | 0 | 4/22 | 7 mo. 3 wk | 0.063 | Bled 2x for total protein, 5 cc. each. |
| 299 | M | do | 12/6–4/21 | 3 | .009 µg | | 5/22 | 8 mo. 3 wk | 0.050 | Bled 5x for total protein, 5 cc. each. |
|  |  | do | 4/21 | 1 | 60th dil | 4 wk |  |  |  |  |
| 237 | F | do | 6/24–8/18 | 12 | .036 µg | | | | | RF strain, bred to #252, MF strain. |
|  |  | Normal Sr | 8/23–9/2 | 4 | 1.2 µg | | | | | Litter born 9/6, weaned 9/24. |
|  |  | Normal Sr, conc | 12/2–12/5 | 6 | 18 mg | | | | | Litter born 12/20, weaned 1/10. |
|  |  | Modified Sr | 1/15–3/15 | 30 | .09 µg | | 7/21 | 1 yr. 8 mo | 0.011 | Litter born 3/14, weaned 4/11. |
|  |  | Normal Sr | 2/26–3/8 | 6 | 18 µg | | | | | |
| 289 | M | Modified Sr | 9/24–11/2 | 15 | .045 µg | 28 days | 11/30 | 8 wk | 0.035 | From 9/6 litter of #237. |
|  |  | Modified Sr, conc | 11/4 | 1 | 3 mg | 26 days |  |  |  |  |
| 291 | M | Normal Sr | 9/24–11/2 | 15 | .045 µg | 28 days | 11/30 | 8 wk | 0.03 | Do. |
|  |  | Normal Sr, conc | 11/4 | 1 | 3 mg | 26 days |  |  |  |  |
| 312 | F | None | | | | | 1/10 | 3 wk | 0.04 | From 12/20 litter of #237. |
| 313 | F | Modified Sr | 1/10–3/19 | 34 | .102 µg | 1 day | 3/20 | 12 wk. 5 da | 0.058 | Do. |
| 314 | F | do | 1/10–4/9 | 55 | .165 µg | 2 days | 4/11 | 15 wk. 5 da | 0.04 | Do. |
| 315 | F | Normal Sr | 4/11–4/24 | 5 | .015 µg | | 6/13 | 3 mo | 0.043 | From 3/14 litter of #237. |
|  |  | do | 4/24–5/18 | 12 | 60th dil | 26 days |  |  |  |  |
| 317 | F | Modified Sr | 4/11–4/24 | 5 | .015 µg | | 6/13 | 3 mo | 0.041 | Do. |
|  |  | do | 4/24–5/18 | 12 | 60th dil | 26 days |  |  |  |  |
| 239 | F | Normal Sr, conc | 12/2–12/15 | 6 | 18 mg | | | | | Litter born 12/16, weaned 1/8; RF, bred to #252. |
|  |  | do | 1/9–5/20 | 60 | 180 mg | | 5/20 | 1 yr. 8 mo | 0.025 | Pregnant about 1 mo. or ¼ term. |
| 310 | M | None | | | | | 1/9 | 3 wk. 2 da | 0.09 | From 12/16 litter of #239. |
| 311 | F | Modified Sr | 1/8–4/8 | 45 | .135 µg | | 4/8 | 12 wk. 6 da | 0.034 | Do. |

TABLE O

*Untreated Guinea Pigs of RF Strain, With Fever During Period in Laboratory, Evidence of Chronic Lesions and Irregularities in Strontium Deposition*

| GP No. | Sex | Date rec'd | Date death | Age at death, wks. | Percent SR in bone ash ||| Comment |
|---|---|---|---|---|---|---|---|---|
| | | | | | Femurs | Right | Left | |
| 324 | F | 4/24 | 5/31 | 12 | 0.039 | | | Caged with #326; died of respiratory infection; lungs extensively diseased. |
| 326 | F | 4/24 | 6/1 | 12 | 0.10 | | | Died of respiratory infection; lungs extensively diseased. |
| 327 | F | 4/24 | 7/8 | 18 | | 0.03 | 0.06 | Fever through life; lungs extensively diseased. |
| 328 | F | 4/24 | 7/8 | 18 | | 0.03 | 0.03 | Fever through life; lungs moderately diseased. |
| 342 | F | 6/4 | 8/13 | 16 | 0.05 | | | Infected eye; slight fever in early weeks; organs normal at autopsy. |
| 343 | F | 6/4 | 8/13 | 16 | 0.02 | | | Fever of 103.4° at 12 weeks; atelectasis at lobe of 1 lung. |
| 344 | F | 6/4 | 8/13 | 16 | 0.03 | | | Intermittent fever, pus in vagina; swelling of pubic area. |

The results indicate that the animals may be prone to infection because of dietary lack of strontium in utero and in infancy, or that birth in an infected environment prevents a normal deposition of strontium, and clearly show the involvement of strontium in the mechanism of disease. The case of No. 297, a healthy RF guinea pig which attained a normal strontium level after 6 weeks on laboratory diet illustrates that there is probably no genetic factor which restricts strontium deposition.

Several experiments were conducted on the effects of feeding normal and/or modified strontium. Experiments on adult female guinea pigs suggested that strontium may be of importance in pregnancy. An MF female was fed modified strontium through pregnancy and sacrificed 19 days after the litter was born. Her strontium level was 0.07%.

Evidence that strontium may be low in pregnancy was shown by a healthy MF female, No. 239. During the latter part of her first pregnancy she was fed a total of 18 mg. of normal strontium. One of her litter, sacrificed at 3 weeks, 2 days, showed a strontium level of 0.09%. No. 239 was fed concentrated normal strontium for 4½ months, a total of 180 mg., while caged with successive males. When sacrified, her strontium level was 0.025%, and she was found to be approximately one month or one half term pregnant. In a normal, non-pregnant animal this dosage would produce increased deposition.

No. 282 received the same dosage of modified strontium as her littermate, No. 281, through her first pregnancy, and was put on the same dosage again after beginning her second pregnancy. Near the end of term she showed evidence of pelvic infection. The belly was almost denuded, and she ran a high fever daily. Her litter of 3 was emaciated, undersized and feeble. One on the day of birth had a strontium level of 0.031; the other 2 died 2 days later. The dam had a strontium level of 0.031. The most probable explanation of this experiment appeared to be that a prolonged overdosage with the 8th dilution exhausted antibody and caused the animal to incur infection.

Several experiments demonstrated that modified strontium may be used to preserve normal strontium balance in bone.

No. 252, a healthy MF male guinea pig, subjected to treatment with modified strontium for 4 months, was given 18 mg. of normal strontium and showed a strontium level in bone of 0.06%, evidently within normal limits.

Three litters bred in the laboratory were given comparative treatment. No. 308 and No. 309 received modified strontium in utero and showed a rapid increase toward adult levels.

The litter of No. 281 was treated with modified strontium in utero and then from weaning until the time of sacrifice. No. 306 and No. 307, given only this treatment, showed at 17 and 18 weeks respectively strontium levels within normal limits. No. 305 received in addition a massive dosage totalling 105 mg. of normal strontium, which without protective treatment would have resulted in increased deposition. The strontium level at 18 weeks was 0.055.

In the litter of No. 235, 2 were fed 12 doses of modified strontium and 1 a similar dosage of normal strontium. At the conclusion of this treatment, each was given a single "shock" dose of concentrated strontium, followed by a latent period to allow time for deposition. Each showed a different balance, the only normal one being 0.07% for the animal which had received only modified strontium.

No. 253 was fed the 8th dilution of a preparation of modified strontium which had been heat-modified for a period greater than the optimum period (17½ hours) for guinea pigs. It had received pepsin digest, $H_2O_2$, heat for 24 hours at 56° C. and exposure to ion exchange resins for 8 days, 1 hour and 17 minutes, a point at which it produced a weak fibrinagglutination. Over-modified substances fail to evoke leukocyte response in hemobiological slides and are believed to sensitive and damage leukocytes.

In the last stages of pregnancy the animal grew visibly weaker without clinical evidence of disease. She ceased eating, there was no sign of fetal life, and in the last days, she was prostrate and showed respiratory distress. Autopsy showed 4 fully developed and apparently normal fetuses. The dam showed slight congestion in the lobe of one lung, but I could find no other evidence of pathology.

The conclusions to be drawn from these exploratory experiments are that strontium is concerned in such important life processes as immunity to disease and pregnancy. It is also evident that modified strontium may be used in oral dosage to protect or restore the normal strontium level in bone tissue, even when massive doses of normal strontium are fed, as in No. 252 and No. 305.

Presently accepted knowledge of strontium metabolism shows that when massive doses of stable strontium are fed, strontium-90 is diluted in the total strontium intake, and the amount deposited in bone tissue is decreased. But if a large dosage of stable strontium is continued, serious metabolic disturbances ensue. The usefulness of modified strontium in exploring a method for protection against strontium-90 is demonstrated by these experiments.

I have studied the modification of the majority of minerals which occur in the body. All reach a zone of fluctuating fibrinagglutination between the 7th and 8th day, and within a period of 14 hours, each displays optimum fibrinagglutination. There is another such zone on the 19th day. In general I have found that the longer a modified substance remains on the resins, the more permanently it retains its capacity to evoke fibrinagglutination after it has been removed.

Each mineral has a point of optmium modification, peculiar to itself, which can be obtained in successive runs on the same mineral. Although I have found several minerals appear to have the same point of clumping, e.g.: cobalt, copper, potassium and silicon, each displays individual differences in the schedule of its fluctuations, during which it reaches several points at which clumps of 1 mm. or more in size are produced.

As exemplary of the manner in which an organism may be modified in accordance with my invention to provide a modified vaccine and endotoxoid, the following examples are presented.

EXAMPLE VIII

A strain of *Brucella abortus*, known as the Perry strain, isolated from a case of brucellosis, was implanted on agar slants and grown for 48 hours at 37.5° C. It was then harvested in normal saline, transferred to sterile centrifuge tubes and centrifuged for about 1 minute at about 1,000 r.p.m. The agar particles were thus removed. It was then transferred to test tubes which were sealed by flame and immersed in a water bath at 60° C. for about 30 minutes. The organism suspensions were transferred to sterile test tubes and tested for growth. Those which were found to be sterile were combined and treated with the addition of pure crystalline pepsin, about 5 mg. or less per cc. of vaccine. The pH was adjusted to 4.6 with 10% HCl and the vaccine incubated for from 18 to 24 hours at 37.5° C. The pH was then adjusted with 10% NaOH to 7.0 and the vaccine oxidized by adding 5 cc. of 30% sodium nitrite and 5 cc. of 30% acetic acid for each 3 cc. of the suspension.

After maintaining at room temperature for about 4 hours, the suspensions were centrifuged, washed twice with sterile distilled water and twice with sterile isotonic sodium chloride solution. The oxidized suspensions were standardized to 5 billion Brucella per cc. by the McFarland barium chloride method, and then heated at about 60° C. for a period of about 24 hours. There was thus obtained a heat-modified vaccine derived from the *Brucella abortus* and a portion thereof was subjected to the influence of ultrasonic waves as previously described.

The usual quantity of vaccine so treated has been 10 cc. The endotoxic toxoid following ultrasonic disruption was transferred to suitable flasks and each flask was checked for growth in broth. An equal quantity of the oxidized and heat-modified vaccine was then added.

EXAMPLE IX

A strain of *Staphylococcus aureus* was employed and the procedure followed was that above described in Example VIII for the Brucella, with the exception that the heat modification was carried out at a temperature of 56° C. for a period of 24 hours. The strain utilized was a pleomorphic light cream-colored coccus of fairly uniform size, mannitol and coagulase negative and non-hemolytic, which had been isolated from a chronic sinus infection. This strain has a special property of broad specificity since it has produced fibrinagglutination whenever tested in blood.

It may be added that a toxoid may be produced only from protein hardened by modification before disruption, or when the disrupted suspension of a heat killed organism is contacted with an ion exchange resin. Other methods of modification destroy the endotoxins.

In accordance with the foregoing there was obtained a toxoid preparation from pathogenic organisms through pepsin digestion, oxidation and heat modification thereof, followed by ultrasonic disruption. It was found that heating to occasion coagulation of the protein material prior to disruption yielded a toxoid which was suitably modified and remained stable for extended periods of time, as at least three years.

EXAMPLE X

A vaccine prepared through pepsin digestion, oxidation and heat modification of a strain of Brucella as described in Example VIII is then contacted with an ion exchange resin in the following manner:

The resins employed may be those designated as "IRA–410" an anionic resin and "IR-120", a cationic resin. The resins should, if necessary, be dried until they will pour readily, following which they are separately sterilized. The sterilization is brought about by placing 1 cc. quantities of each resin in small vials which are sterilized in an autoclave at a pressure of about 15 pounds per sq. in. and for a period of about 20 minutes. The vials in which the "IR-120" is sterilized are screw top and when cool and ready for use, the vials are opened under a sterile lamp.

1 cc. of the "IRA-410" is poured into the screw top vial containing the "IR-120" whereupon the vaccine to be further modified is added in a quantity not greater than about 10 cc. The mixture is then well shaken and placed in an incubator at a temperature of about 37° C. for about 3½ weeks. The optimum time of contacting with the ion exchange resin may conveniently be determined by my fibrinagglutination technique above described. In the case of the Perry strain of *Brucella abortus* of Example VIII an optimum time was found to be 24 days, 1 hour, and 17 minutes, as shown by formation of large purple clumps on the test slide.

When a biochemical is utilized, as hormones, amino acids, vitamins, and glucuronic acid, it is desirable to oxidize with hydrogen peroxide rather than as described in Example VIII, and in accordance therewith about one-half volume of sterile commercial 3% hydrogen peroxide may be added to a suspension or solution of the biochemical and the mixture heated to a temperature of about 37° C. for about 24 hours.

Hence, the modification procedure includes the use of a proteolytic enzyme such as pepsin and papain, and it may be added to a bacterial suspension prior to or after the oxidation and heating. Thus 2 mg. of pepsin may be added to about 10 cc. of a heavy bacterial suspension. The pH thereof is adjusted to about 4.6 and the suspension placed in an incubator at about 37° C. for about 24 hours. Following incubation, the pH value is adjusted to neutrality (pH 7), whereupon it is contacted with an ion exchange resin as hereinbefore described.

Toxoids which are prepared by ultrasonic disruption of vaccines which have been pepsin digested, oxidized and heat-modified, may be treated further by contact with an ion exchange resin. Thus, a toxoid may be prepared by adding pepsin to a bacterial suspension followed by oxidation, heating to a temperature from about 56° C. to about 64° C., ultrasonically disrupting, and contacting with an ion exchange resin.

Further, heat modification gradually decreases the toxicity of the exo- and endotoxins, but the vaccines are increased in toxicity if heated for less than the time optimum for a species and suffer a decrease in antigenic properties if the heating is prolonged beyond the time optimum for particular species. Accordingly, in one embodiment, my invention entails a detoxication of pathogenic organisms through pepsin digestion, oxidation and heat modification which renders them well adapted as vaccines, and for the ultrasonic disruption of the organsims so modified with the production of endotoxic toxoids. Additionally, the vaccines, toxoids and biochemicals may be further modified by contact with an ion exchange resin.

Furthermore, modification reduces the capacity of biological substances to damage the blood from pathologic states by the in vitro oxidation and reduction of hemoglobin and inhibition of lysis of the clot as seen in hemobiological slides. The modification of bacterial, viral and biochemical substances entails a physical change, such as alteration of color and viscosity, increased resistance of vaccines to ultrasonic disruption and increased agglutinability of vaccine in serum.

This application is a continuation-in-part of my application S.N. 129,495, filed November 25, 1949, now abandoned, and my application S.N. 342,260, filed March 3, 1953, now abandoned.

I claim:

1. A method of reducing the toxicity of an antigen while retaining its antigenicity, which comprises treating the antigen by adding thereto a proteolytic enzyme, adding to the treated antigen an oxidizing agent, heating said oxidized and treated antigen for about 15–28 hours at a temperature in the range of about 50°–100° C., and contacting the heated resultant with an ion exchange resin.

2. A method of reducing the toxicity of an antigen while retaining its antigenicity, which comprises digesting the antigen with pepsin at a pH in the range of about 3–5 at a temperature of about 37° C. for about 16–24 hours, adjusting the pH of the resultant mixture to about 7, oxidizing the digested antigen for about 4–24 hours, heating the oxidized and digested antigen for about 15–28 hours at a temperature in the range about 55°–65° C. and contacting the heated resultant with a mixture of anionic and cationic ion exchange resins.

3. In a method of reducing the toxicity of an antigen while retaining its antigenicity, which includes the steps of proteolytic enzyme digest, oxidizing, heating, and contacting with an ion exchange resin, the improvement which comprises terminating contact with the ion exchange resin at the point at which the substance in contact with the ion exchange resin causes maximum fibrinagglutination in blood.

4. In a method of reducing the toxicity of an antigen while retaining its antigenicity, which includes the steps of proteolytic enzyme digest, oxidizing, heating and contacting with an ion exchange resin, the improvement which comprises maintaining said contact with the ion exchange resin until material in contact with the ion exchange resin exhibits maximum fibrinagglutination when admixed with blood and toluidin blue dye and bluish eosin dye is added to said admixture.

5. In a method of reducing the toxicity of an antigen while retaining its antigenicity, which includes the steps of proteolytic enzyme digest, oxidizing, heating and contacting with an ion exchange resin, the improvement for determining optimum heating which comprises admixing material so heated and blood leukocytes, whereby optimum heating is determined by disappearance of all said leukocytes from said admixture.

6. A method of reducing the toxicity of an anaphylactogen while retaining its antigenicity, which comprises treating the anaphylactogen by adding thereto a proteolytic enzyme at a pH of about 4.6, oxidizing the treated anaphylactogen, heating said oxidized and treated anaphylactogen at about 55°–65° for about 20–28 hours, and contacting the heated resultant with an ion exchange resin.

7. A method of reducing the toxicity of a microbiological organism which causes an infection in animals, while retaining the antigenicity of said organism, which comprises modifying the organism by digesting said organism with a proteolytic enzyme, oxidizing said digested organism, heating the oxidized, digested organism at about 55°–65° C. for about 20–28 hours, subjecting a portion of the resultant to ultrasonic waves to disrupt cells of the organism, combining the disrupted and undisrupted portions of the organism and contacting the said combined portions with an ion exchange resin.

8. A method of increasing fibrinogen content of animal blood, which comprises administering to animals histamine which has been modified by digesting with a proteolytic enzyme, oxidizing the digested histamine, heating the oxidized and digested histamine for about 20–28 hours at about 55°–65° C., and contacting the resultant with an ion exchange resin.

9. As a composition of matter, a microbiological organsim which causes an infection in animals, which organism has been modified by proteolytic enzyme digest, oxidation, heating at about 55°–65° C. for about 20–28 hours, disruption of the cells of a portion of the treated organism by ultrasonic waves, and contacting the disrupted and undisrupted portions with an ion exchange resin.

10. The composition of matter of claim 9 wherein the organism is a brucella.

11. The composition of matter of claim 9 wherein the organism is a staphylococcus.

12. The composition of matter of claim 9 wherein the organism is a streptococcus.

13. The composition of matter of claim 9 wherein the organism is Escherichia coli.

14. A composition of matter comprising an anaphylactogen which has been modified by proteolytic enzyme digest, oxidation, heating at about 55°–65° C. for about 20–28 hours, and contacting with an ion exchange resin.

15. The composition of claim 14, wherein the anaphylactogen is ovalbumin.

16. The composition of claim 14, wherein the anaphylactogen is an animal serum.

References Cited in the file of this patent

UNITED STATES PATENTS

| | | |
|---|---|---|
| 2,123,198 | Parfentjev | July 12, 1938 |
| 2,230,997 | Chambers | Feb. 11, 1941 |
| 2,288,738 | Parfentjev | July 7, 1942 |
| 2,368,464 | Gerlough | Jan. 30, 1945 |
| 2,461,505 | Daniel | Feb. 15, 1949 |
| 2,461,506 | Daniel | Feb. 15, 1949 |
| 2,578,491 | Shropshire | Dec. 11, 1951 |

FOREIGN PATENTS

| | | |
|---|---|---|
| 468,676 | Great Britain | Oct. 9, 1934 |
| 493,101 | Great Britain | Sept. 30, 1938 |
| 682,768 | Great Britain | Nov. 19, 1952 |

OTHER REFERENCES

Bronfenbrenner: Pros. Soc. Expt. Biol. Med., XXVII, pp. 734–735, April 1930.

Myers: Ind. and Eng. Chem., June 1941, pp. 697–706, vol. 33, No. 6.

Foshay et al.: American Jour. of Public Health, vol. 32, October 1942, pp. 1131–1145.

Gershenfeld: Bacteriology and Allied Science, Mack Publishing Co., Easton, Pa., 1945, pp. 294–295.

Green: J. Bacter., April 1946, pp. 487–493.

Taub: J. Am. Pharm. Assoc. Sc. Ed., vol. 37, 1948, pp. 246–250.

Drug and Cosmetic Industry, February 1948, p. 245.

Zinsser's Textbook of Bacteriology, 1948, pp. 918 and 939.

UNITED STATES PATENT OFFICE
CERTIFICATE OF CORRECTION

Patent No. 3,097,141                                                       July 9, 1963

Elizabeth N. Willcox Kidwell

It is hereby certified that error appears in the above numbered patent requiring correction and that the said Letters Patent should read as corrected below.

In the grant, lines 1 and 12, and in the heading to the printed specification, line 3, for "Elizabeth N. Wilcox Kidwell," each occurrence, read -- Elizabeth N. Willcox Kidwell, --; column 1, line 64, for "sealed" read -- unsealed --; column 4, line 75, for ".1" read -- 1 --; column 6, line 11, for "tot" read -- to --; column 8, line 8, for "venus" read -- venous --; columns 11 and 12, TABLE F, under the column heading "Convulsions" in the line relating to GP No. 359C, for "X" read -- XX --; columns 21 and 22, TABLE J, in the heading to the third date box, for "10/11" read -- 11/11 --; column 24, line 50, for "vegatables" read -- vegetables --; column 28, line 40, for "sensitive" read -- sensitize --; column 29, line 1, for "optmium" read -- optimum --; column 30, lines 61 and 62, for "organsims" read -- organisms --.

Signed and sealed this 11th day of February 1964.

(SEAL)
Attest:
ERNEST W. SWIDER                                        EDWIN L. REYNOLDS Attesting Officer                                      Acting Commissioner of Patents

UNITED STATES PATENT OFFICE
CERTIFICATE OF CORRECTION

Patent No. 3,097,141                      July 9, 1963

Elizabeth N. Willcox Kidwell

It is hereby certified that error appears in the above numbered patent requiring correction and that the said Letters Patent should read as corrected below.

In the grant, lines 1 and 12, and in the heading to the printed specification, line 3, for "Elizabeth N. Wilcox Kidwell," each occurrence, read -- Elizabeth N. Willcox Kidwell, --; column 1, line 64, for "sealed" read -- unsealed --; column 4, line 75, for ".1" read -- 1 --; column 6, line 11, for "tot" read -- to --; column 8, line 8, for "venus" read -- venous --; columns 11 and 12, TABLE F, under the column heading "Convulsions" in the line relating to GP No. 359C, for "X" read -- XX --; columns 21 and 22, TABLE J, in the heading to the third date box, for "10/11" read -- 11/11 --; column 24, line 50, for "vegatables" read -- vegetables --; column 28, line 40, for "sensitive" read -- sensitize --; column 29, line 1, for "optmium" read -- optimum --; column 30, lines 61 and 62, for "organsims" read -- organisms --.

Signed and sealed this 11th day of February 1964.

(SEAL)
Attest:
ERNEST W. SWIDER                      EDWIN L. REYNOLDS

Attesting Officer               Acting Commissioner of Patents